United States Patent
Pope et al.

(10) Patent No.: US 11,879,871 B2
(45) Date of Patent: Jan. 23, 2024

(54) SAFETY SYSTEMS REQUIRING INTENTIONAL FUNCTION ACTIVATION AND MATERIAL TESTING SYSTEMS INCLUDING SAFETY SYSTEMS REQUIRING INTENTIONAL FUNCTION ACTIVATION

(71) Applicant: Illinois Tool Works Inc., Glenview, IL (US)

(72) Inventors: Mary Elizabeth Pope, Newton, MA (US); Elena Rose Mangano, Brighton, MA (US); Andrew DeWolfe, Providence, RI (US)

(73) Assignee: Illinois Tool Works Inc., Glenview, IL (US)

( * ) Notice: Subject to any disclaimer, the term of this patent is extended or adjusted under 35 U.S.C. 154(b) by 723 days.

(21) Appl. No.: 16/697,891

(22) Filed: Nov. 27, 2019

(65) Prior Publication Data
US 2020/0173895 A1 Jun. 4, 2020

Related U.S. Application Data

(60) Provisional application No. 62/773,947, filed on Nov. 30, 2018.

(51) Int. Cl.
*G01N 3/06* (2006.01)
*F16P 3/00* (2006.01)
(Continued)

(52) U.S. Cl.
CPC ................ *G01N 3/06* (2013.01); *F16P 3/003* (2013.01); *F16P 3/18* (2013.01); *F16P 3/20* (2013.01);
(Continued)

(58) Field of Classification Search
CPC .... F16P 3/00; F16P 3/001; F16P 3/003; F16P 3/005; F16P 3/008; F16P 3/02; F16P 3/04;
(Continued)

(56) References Cited

U.S. PATENT DOCUMENTS

| | | | | |
|---|---|---|---|---|
| 3,749,005 A | * | 7/1973 | Einecker | F16P 3/20 100/344 |
| 3,880,561 A | | 4/1975 | Ferro | |

(Continued)

FOREIGN PATENT DOCUMENTS

| | | | | |
|---|---|---|---|---|
| CN | 110308678 A | * | 10/2019 | ............ F15B 11/028 |
| DE | 102016107583 A1 | * | 10/2017 | ........... G05B 19/409 |

(Continued)

OTHER PUBLICATIONS

Int'l Search Report and Written Opinion Appln No. PCT/US2019/063873 dated Mar. 4, 2020.
(Continued)

*Primary Examiner* — Jonathan M Dunlap
(74) *Attorney, Agent, or Firm* — McAndrews, Held & Malloy, Ltd.

(57) ABSTRACT

Safety systems requiring intentional function activation and material testing systems including safety systems requiring intentional function activation are disclosed. An example material testing system includes: an actuator configured to control an operator-accessible component of the material testing system; an operator interface comprising a plurality of inputs; and one or more processors configured to: control the actuator based on at least one of a material testing process or an input from the operator interface; and require two or more inputs to be received within a predetermined threshold time to permit at least one operation of the actuator.

13 Claims, 10 Drawing Sheets

(51) Int. Cl.
*F16P 3/18* (2006.01)
*F16P 3/20* (2006.01)
*F16P 3/22* (2006.01)
*F16P 3/24* (2006.01)
*G05B 19/406* (2006.01)

(52) U.S. Cl.
CPC . *F16P 3/22* (2013.01); *F16P 3/24* (2013.01); *G01N 2203/0202* (2013.01); *G05B 19/406* (2013.01)

(58) Field of Classification Search
CPC ........ F16P 3/06; F16P 3/14; F16P 3/12; F16P 3/18; F16P 3/20; F16P 3/22; F16P 3/24; F16P 3/142; F16P 3/144; F16P 3/148; G01N 3/06; G01N 3/02; G01N 3/08; G01N 2203/0202; G01N 2203/0016; G05B 23/0216; G05B 2219/50198; G05B 19/406
See application file for complete search history.

(56) References Cited

U.S. PATENT DOCUMENTS

| | | | | |
|---|---|---|---|---|
| 4,939,358 | A * | 7/1990 | Herman | G01V 8/12 250/221 |
| 6,392,169 | B1 * | 5/2002 | Linger | F16P 3/20 200/334 |
| 2004/0227816 | A1 * | 11/2004 | Sato | F16P 3/142 348/143 |
| 2008/0007417 | A1 * | 1/2008 | Weishaar | F16P 3/144 100/341 |
| 2011/0098830 | A1 * | 4/2011 | Weddingfeld | G05B 19/0426 700/79 |
| 2014/0088737 | A1 * | 3/2014 | Sokoll | G05B 19/048 700/83 |
| 2017/0292650 | A1 * | 10/2017 | Namou | G06V 20/52 |
| 2017/0310389 | A1 * | 10/2017 | McMonagle | G08C 23/04 |
| 2019/0211505 | A1 * | 7/2019 | Wick | G05B 19/042 |

FOREIGN PATENT DOCUMENTS

| | | |
|---|---|---|
| EP | 0115753 | 8/1984 |
| JP | 1995012263 | 1/1995 |
| JP | 2010002290 | 1/2010 |
| WO | 2017176568 | 10/2017 |

OTHER PUBLICATIONS

European Exam Report Appln No. 19824146.5 dated May 26, 2023.
Japanese Office Action Appl No. 2021-531018 dated Jul. 5, 2023.

* cited by examiner

SAFETY SYSTEMS REQUIRING INTENTIONAL FUNCTION ACTIVATION AND MATERIAL TESTING SYSTEMS INCLUDING SAFETY SYSTEMS REQUIRING INTENTIONAL FUNCTION ACTIVATION

RELATED APPLICATIONS

This patent claims priority to U.S. Provisional Patent Application Ser. No. 62/773,947, filed Nov. 30, 2018, entitled "SAFETY SYSTEMS REQUIRING INTENTIONAL FUNCTION ACTIVATION AND MATERIAL TESTING SYSTEMS INCLUDING SAFETY SYSTEMS REQUIRING INTENTIONAL FUNCTION ACTIVATION." The entirety of U.S. Provisional Patent Application Ser. No. 62/773,947 is incorporated herein by reference.

BACKGROUND

This disclosure relates generally to materials testing, and more particularly, to safety systems requiring intentional function activation and material testing systems including safety systems requiring intentional function activation.

Universal testing machines are used to perform mechanical testing, such as compression strength testing or tension strength testing, on materials or components.

SUMMARY

Safety systems requiring intentional function activation and material testing systems including safety systems requiring intentional function activation are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
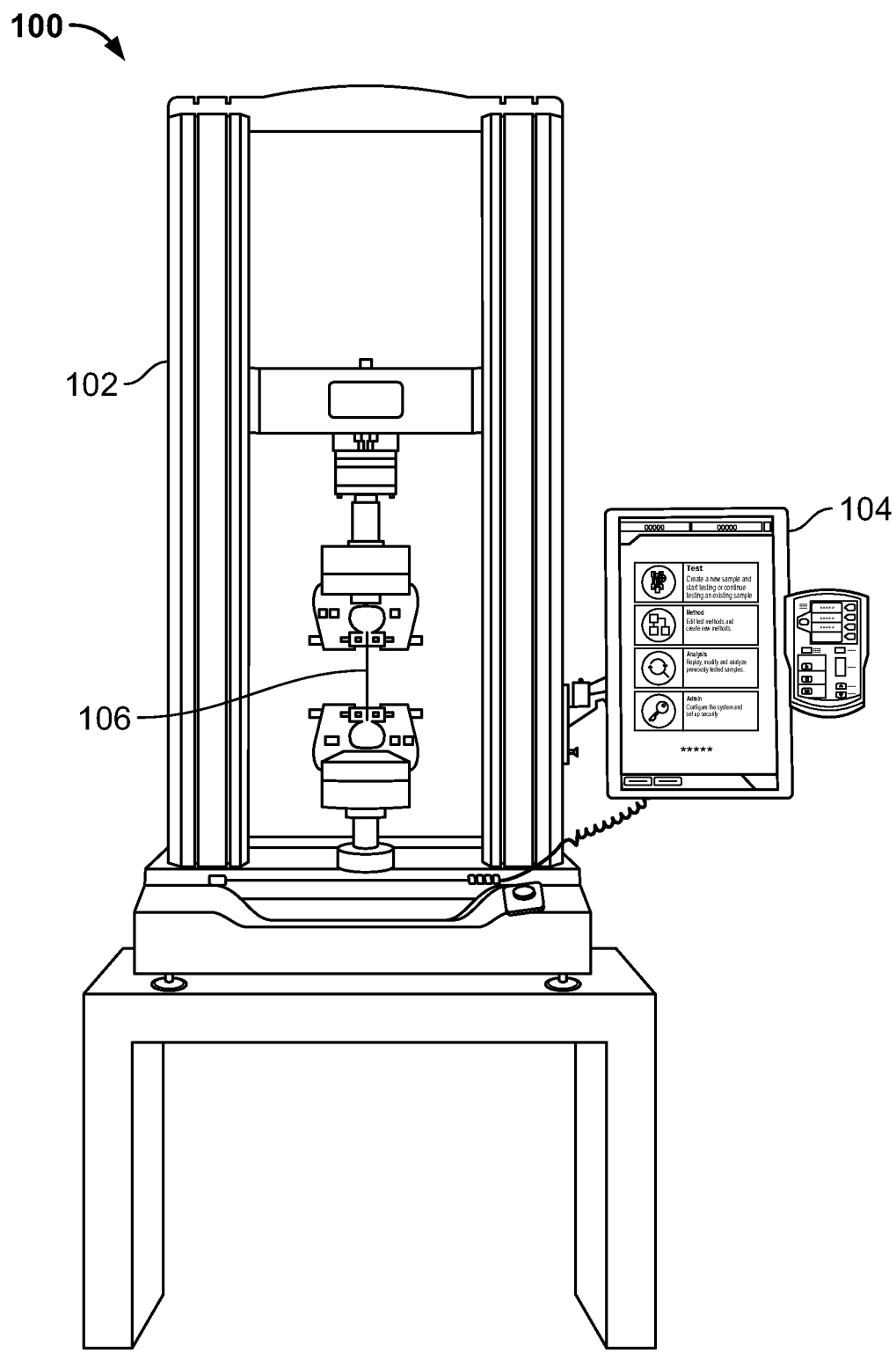
FIG. 1 is an example testing device to perform mechanical property testing, in accordance with aspects of this disclosure.

Conventional material testing systems use mitigation techniques, such as configuration switches, guarding, limited force controls, motion limiting, and/or protection, to improve operator safety. However, conventional material testing systems frequently do not always comply with international standards. Conventional mitigation techniques require the operator to place the system in the appropriate mode of operation, such as safe interaction or testing. Many conventional safety techniques can be implemented using off-the-shelf safety components, such as programmable logic controllers (PLCs) and/or relays. PLCs and relays typically add significant cost to the material testing system.

Disclosed example material testing systems embed or integrate a safety system complying with international standards within the material testing system. Because the safety system is integrated into the material testing systems, disclosed example material test systems provide safety improvements at a much lower cost than would be accomplished using off-the-shelf parts because the safety system is integrated into the existing electronics, semiconductors, and/or circuit boards of the material testing systems. Integration further improves reliability, which reduces or eliminates external wiring between purchased safety components.

As described in more detail below, disclosed example safety systems for material testing systems include machine state indicators that visually show the state of the testing machine from an operational restriction perspective. Disclosed example safety systems for material testing systems provide high reliability and monitored activation mechanisms at the machine point of control, which may include internal fault checking and/or power supply diagnostics within the material testing systems. In some examples, pneumatic grips are provided with two stage grip pressure control and monitoring. Disclosed example material testing systems are compatible with interlock guarding systems having redundant or diverse contacts. Such guarding systems comply with ISO safety standards by using redundant, diverse, and/or dynamic monitoring in real time. Disclosed example material testing systems include redundant crosshead travel limit monitoring. The material testing system shutdown circuitry of disclosed examples is compliant with international safety standards including ISO 13849-1.

Additionally, conventional off-the-shelf safety relay components used with PLCs use an extra layer of firmware within the PLC to stop the motion of the moving components during an emergency stop event. Disclosed example safety systems for material testing systems are configured to enable the hardware (e.g., an emergency stop button) to directly shutdown a power amplifier drive to the actuator(s), regardless of whether the embedded firmware within the safety processor is running.

Disclosed example material testing systems are compliant with the European Machinery Directive, following the rules set forth in the ISO 13849-1 standard, which pertains to the "Safety Related Parts of Control Systems." The following functions, which are determined by a system risk analysis, are integrated into the material testing system. The safety system provides a disabled drive state to remove energy from the drive crosshead, a disabled drive state to remove energy from the gripping system, and a restricted drive state for operator setup. In the restricted drive state, the example safety systems monitor the crosshead speed to maintain the crosshead speed below an upper speed limit, monitor for intentional manual movement (jogging) of the crosshead, monitor for reduced gripping pressure when closing, and/or monitor for intentional grip closure.

As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling. Firmware may include stored instructions such as Safety Rated Embedded Software (SRESW) and/or Safety Rated Application Software (SRASW).

The disclosed example material testing systems further include an unrestricted drive state, which enables the removal of checks in the restricted drive state. In some examples, the unrestricted drive state can be entered via a dual activation mechanism, in which material testing functionality is performed and the operator does not interact with the system.

Disclosed example material testing systems include indicators for different states, such as a disabled state, a setup state (e.g., restricted drive mode), a caution state (e.g., unrestricted drive mode), and a testing state (e.g., unrestricted drive mode) indication on every machine to clearly indicate when the operator may interact and when a hazard is present.

Disclosed example material testing systems include one or more stop functions that are configured to take precedence over the starting and/or continuation of motion of components such as the crosshead or grips. Furthermore, one or more stop functions may be redundantly configured via hardware such that the stop functions are effective to disable the material testing system even when software portions of the safety system are disabled. Examples of such stop functions that may be included in disclosed systems include interlocked guards and/or emergency stop switches.

Some disclosed example material testing systems include selection and enforcement of a single control point for starting the material testing frame and/or gripping system. Some example systems provide power failure monitoring and/or protection to ensure the system stops unrestricted operation and places the material test system into the disabled drive state upon re-establishment of power. In some examples, in response to a power failure, any pneumatic specimen gripping is automatically de-energized.

Disclosed example safety systems and material testing systems include increased internal diagnostics and reporting to the operator of critical errors within the system, such as malfunctions of equipment or conflicts between redundant inputs, outputs, and/or processes. Disclosed example material testing systems enable faster specimen removal and/or insertion, relative to conventional material testing systems, due to the safe setup mode of the testing machine that permits operator activity within the test space without disabling of the material testing system or requiring guard doors. Disclosed example systems further improve operator safety when setting up and configuring the system inside the test space, due at least in part to use of the setup state, which restricts motion of the crosshead and/or limited motion and/or force that can be exerted by the grips.

Disclosed material testing systems and safety systems may be specially configured to be utilized in the disclosed example configurations, to achieve identified risk mitigations. Disclosed material testing systems are significantly more efficient and targeted to materials testing than purchasing general purpose, off-the-shelf, discrete safety components.

Disclosed example material testing systems include: an actuator configured to control an operator-accessible component of the material testing system; an operator interface including a plurality of inputs; and one or more processors configured to: control the actuator based on at least one of a material testing process or an input from the operator interface; and require two or more inputs to be received within a predetermined threshold time to permit at least one operation of the actuator.

In some examples, the one or more processors are configured to require the two or more inputs to initiate each operation of the actuator by the processor. In some examples, the one or more processors are configured to, in response to pausing or cessation of the operation of the actuator, require the two or more inputs to restart the operation or start a different operation. In some examples, the operator interface includes a button configured to output an unlocking signal while the button is depressed, wherein the one or more processors are configured to use the unlocking signal as one of the two or more inputs.

In some examples, the operator-accessible component includes an automatic grip configured to grip a material under test, wherein the actuator is configured to actuate the automatic grip, and the at least one operation includes applying more than a threshold pressure via the automatic grip. In some examples, the one or more processors are configured to permit control of the actuator to apply less than the threshold pressure via the automatic grip while fewer than the two or more inputs are received. In some examples, the operator-accessible component includes a crosshead configured to move to position a material under test or to apply force to the material under test, and the at least one operation includes at least one of moving of the crosshead or applying the force to the material under test.

In some examples, the operator-accessible component includes a crosshead configured to move to position a material under test or to apply force to the material under test, in which the at least one operation includes moving the crosshead at least a threshold speed. In some examples, the one or more processors are configured to permit control of the actuator to move the crosshead at less than the threshold speed while fewer than the two or more inputs are received. In some examples, the one or more processors are configured to, during operation of the actuator, cease operation of the actuator in response to determining that at least one of the two or more inputs is no longer being received.

In some examples, the one or more processors are configured to, during operation of the actuator, cease operation of the actuator in response to determining that none of the two or more inputs are being received. In some example material testing systems, the one or more processors are configured to, during operation of the actuator, continue operation of the actuator after the two or more inputs are no longer being received. In some such examples, the one or more processors are configured to cease operation of the actuator based on at least one of a conclusion of the material testing process, a pause in the material testing process, or an input from the operator interface.

In some example material testing systems, the one or more processors include: a control processor configured to perform the control of the actuator; and one or more safety processors configured to identify the two or more inputs and to permit at least one operation of the actuator.

Some disclosed example material testing systems include: an actuator configured to control an operator-accessible component of the material testing system; an operator interface including a plurality of inputs; a camera and a video processor configured to: detect an intrusion by processing images output by the camera; and output a non-detection signal in response to determining that an intrusion is not detected; and one or more processors configured to: control the actuator based on at least one of a material testing process or an input from the operator interface; and require two or more inputs to be received to permit at least one operation of the actuator, at least one of the two or more inputs including the non-detection signal.

Some disclosed material testing systems include: an actuator configured to control an operator-accessible component of the material testing system; an operator interface including a plurality of inputs; a pressure sensitive surface configured to: detect the presence of a pressure on the surface; and output a pressure signal in response to detecting the pressure; and one or more processors configured to: control the actuator based on at least one of a material testing process or an input from the operator interface; and require two or more inputs to be received to permit at least one operation of the actuator, at least one of the two or more inputs including the non-detection signal.

Some disclosed material testing systems include: an actuator configured to control an operator-accessible component of the material testing system; an operator interface including a plurality of inputs; an operator detection switch configured to output a switch signal while the switch is actuated; and one or more processors configured to: control the actuator based on at least one of a material testing process or an input from the operator interface; and require two or more inputs to be received to permit at least one operation of the actuator, at least one of the two or more inputs including the switch signal.

Some disclosed material testing systems include: an actuator configured to control an operator-accessible component of the material testing system; an operator interface including a plurality of inputs; a presence detector configured to: detect a presence of an operator within a predefined volume; and output a presence signal when an operator is detected within the volume; and one or more processors configured to: control the actuator based on at least one of a material testing process or an input from the operator interface; and require two or more inputs to be received to permit at least one operation of the actuator, at least one of the two or more inputs comprising the presence signal.

Some disclosed material testing systems include: an actuator configured to control an operator-accessible component of the material testing system; an operator interface including a plurality of inputs; a proximity sensor configured to: monitor whether an operator is within a predetermined proximity of the proximity switch; and output a non-proximity signal when an operator is not detected within the predetermined proximity; and one or more processors configured to: control the actuator based on at least one of a material testing process or an input from the operator interface; and require two or more inputs to be received to permit at least one operation of the actuator, at least one of the two or more inputs including the non-proximity signal.

FIG. 1 is an example material testing system 100 to perform mechanical property testing. The example material testing system 100 may be, for example, a universal testing system capable of static mechanical testing. The material testing system 100 may perform, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally or alternatively, the material testing system 100 may perform dynamic testing.

The example material testing system 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106. While the example test fixture 102 is illustrated as a dual column fixture, other fixtures may be used, such as single-column test fixtures.

The example computing device 104 may be used to configure the test fixture 102, control the test fixture 102, and/or receive measurement data (e.g., transducer measurements such as force and displacement) and/or test results (e.g., peak force, break displacement, etc.) from the test fixture 102 for processing, display, reporting, and/or any other desired purposes.

Figure 2:
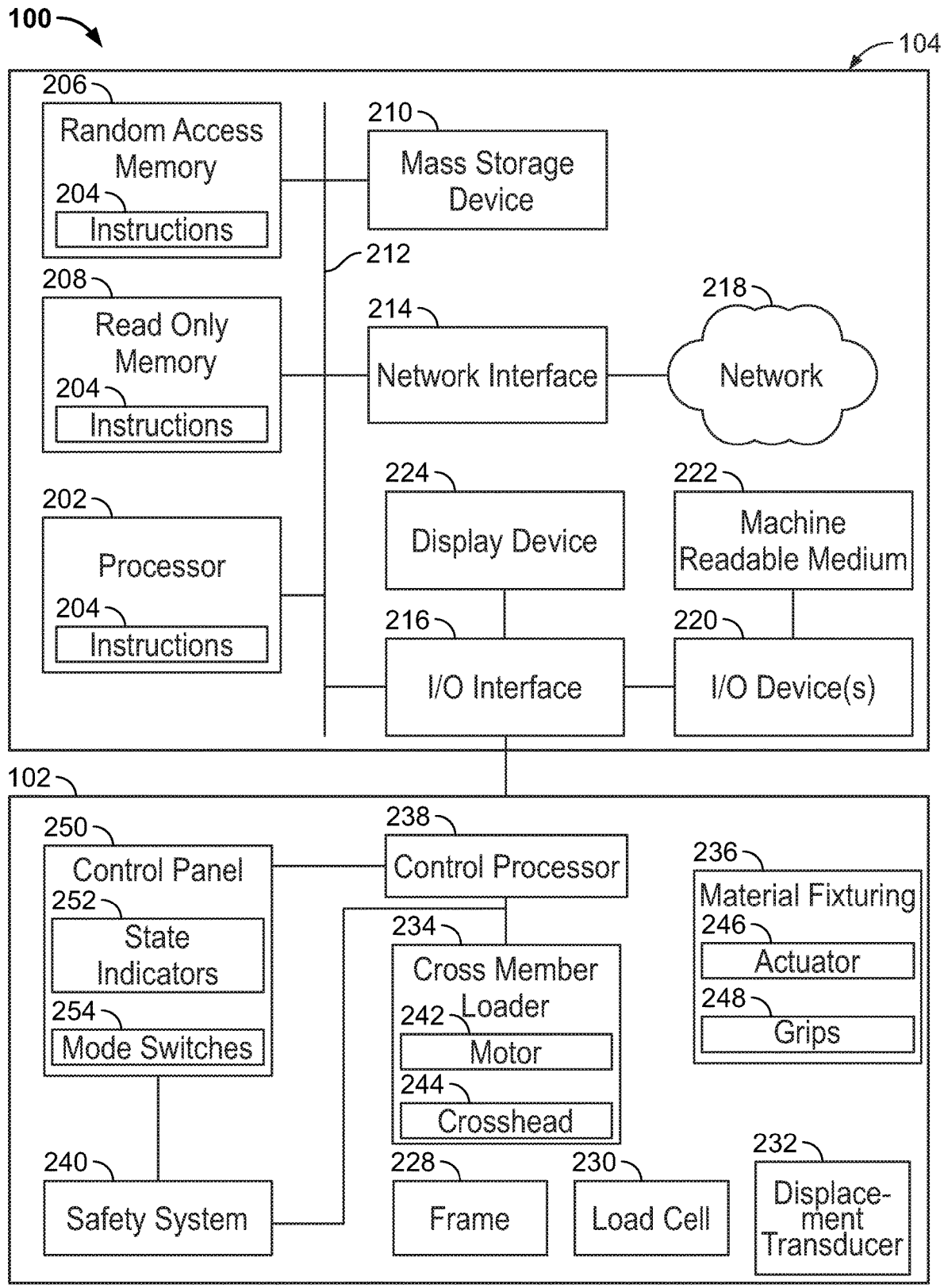
FIG. 2 is a block diagram of an example implementation of the testing device of FIG. 1.

FIG. 2 is a block diagram of an example implementation of the material testing system 100 of FIG. 1. The example material testing system 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing device 104 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing device 104 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example material testing system 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 104 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example material testing system 100 of FIG. 1 further includes the test fixture 102 coupled to the computing device 104. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 and/or to the I/O interface 216 via a wired or wireless connection (e.g., Ethernet, Wi-Fi, etc.), either directly or via the network 218.

The test fixture 102 of FIG. 2 includes a frame 228, a load cell 230, a displacement transducer 232, a cross-member loader 234, material fixtures 236, a control processor 238, and a safety system 240. The frame 228 provides rigid structural support for the other components of the test fixture 102 that perform the test. The load cell 230 measures force applied to a material under test by the cross-member loader 234 via the grips 236. The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the material testing system 100 include electric motors, pneumatic actuators, hydraulic actuators, piezoelectric actuators, relays, and/or switches.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The example control processor 238 communicates with the computing device 104 to, for example, receive test parameters from the computing device 104 and/or report measurements and/or other results to the computing device 104. For example, the control processor 238 may include one or more communication or I/O interfaces to enable communication with the computing device 104. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example safety system 240 provides an additional layer of monitoring and control to the test fixture 102. The safety system 240 monitors operator inputs and the state of the test fixture 102. In the example of FIG. 2, the safety system 240 restricts operation of the test fixture 102 by the user so that the test fixture 102 is only controllable by the user when the machine is in an appropriate state. In response to detecting one or more conditions, the safety system 240 will automatically cause the test fixture 102 to go to a restricted state (e.g., a restricted setup state, disable all power and motion that could present a hazardous condition, etc.).

As discussed in more detail below, the safety system 240 selectively adds, removes, increases, and/or decreases restrictions on operation of the material testing system based on monitoring input signals from the material testing system 100, input signals from the safety system 240, and/or control signals from the control processor 238. The safety system 240 controls operation of the material testing system 100 by determining a state, from multiple predetermined states, in which the material testing system 100 is to be operated at any given time. Example predetermined states include one or more restricted states, in which one or more operations of the material testing system 100 are restricted (e.g., disabled, limited, etc.) and one or more unrestricted states, in which the restrictions of the restricted states are reduced and/or removed. In the example of FIG. 2, the safety processor 240 attaches to and/or interrupts the control of the cross-member loader 234 and/or the fixture(s) 236 by the control processor 238. In some other examples, the safety system 240 may directly control the cross-member loader 234 and/or the fixture(s) 236 while enforcing any applicable restrictions on the actuators.

Example restricted states include a setup state and a disabled state. In the setup state, the safety system 240 restricts one or more actuators (e.g., the motor 242 and/or the grip actuator(s) 246), and controls (or permits control of) the actuators in response to operator inputs. Example restrictions on the motor 242 and/or the crosshead 244 may include an upper speed limit, and/or an upper or lower position limit of the crosshead 244 relative to the test fixture 102. Example restrictions on the grip actuator(s) 246 may include an upper pressure limit and/or an upper grip force limit. In the disabled state, the safety system 240 restricts the actuators and the control processor 238 does not control the actuator in response to operator inputs (e.g., does not attempt to control the motor 242 and/or the grip actuator(s) 246, or is prevented from controlling the motor 242 and/or the grip actuator(s) 246 via de-energization).

Example unrestricted states include a caution state and a testing state. In the example caution state, the safety system 240 reduces restrictions on the actuator (e.g., motor 242 and/or the grip actuator(s) 246), and does not control the actuator(s) motor 242 and/or the grip actuator(s) 246. In the caution state, the control processor 238 may control the actuator(s) to perform actions such as high speed jogging of the crosshead 244 and/or increasing grip force by the pneumatic grips 248, for which the operator should not be physically proximate the crosshead 244 and/or the pneumatic grips 248. In the example testing state, the safety system 240 reduces restrictions on the actuator, while the control processor 238 controls the actuator(s) to perform testing (e.g., in accordance with a material testing procedure or program executed by the control processor 238).

The example material testing system 100 of FIG. 2 may further include one or more control panels 250, including multiple state indicators 252 and one or more mode switches 254. The mode switches 254 may include buttons, switches, and/or other input devices located on an operator control panel. For example, the mode switches 254 may include buttons that control the motor 242 to jog (e.g., position) the crosshead 244 at a particular position on the frame 228, switches (e.g., foot switches) that control the grip actuators 246 to close or open the pneumatic grips 248, a mode control button that is depressed in conjunction with another button to enable the safety system 240 to permit operation in an unrestricted state, and/or any other input devices that could result in operation in an unrestricted state.

The state indicators 252 correspond to a set of predetermined states (e.g., the disabled, setup, caution, and testing states described above) to which the safety system 240 can set the material testing system 100. As described in more detail below, the safety system 240 controls the state indicators 252 to provide an indication as to the present state of the material testing system 100 as determined by the safety system 240. The state indicators 252 may include lights, displays, audio, mechanical systems, and/or any other indication that can be identified by the operator.

Figure 3:
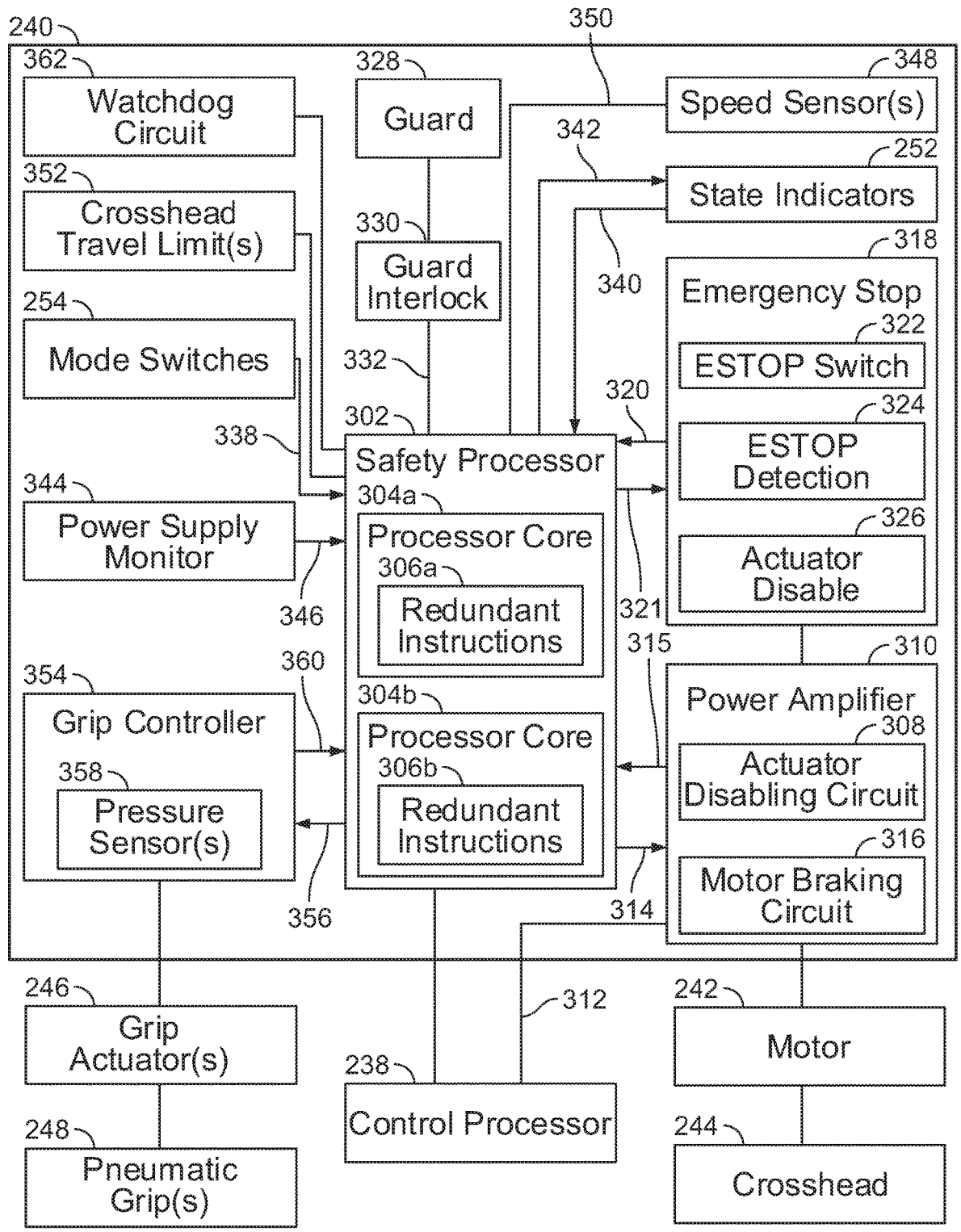
FIG. 3 is a block diagram of an example implementation of the safety system of FIG. 2.

FIG. 3 is a block diagram of an example implementation of the safety system 240 of FIG. 2. As illustrated in FIG. 3, the safety system 240 includes a safety processor 302.

The example safety processor 302 includes multiple, redundant processing cores 304a, 304b. The processing cores 304a, 304b execute redundant instructions 306a, 306b and receive redundant inputs, such that the processing cores 304a, 304b should, during normal operation of the test fixture 102, produce substantially identical outputs. The safety processor 302 (e.g., via the redundant cores 304a, 304b) monitors the plurality of inputs and determines the state of the material testing system 100 based on the inputs. The safety processor 302 may compare outputs of the redundant instructions 306a 306b and control the state of the material testing system 100 based on the comparison of the outputs.

The example safety processor 302 and/or the redundant processing cores 304a, 304b may be include general purpose central processing unit (CPU) from any manufacturer. In some other examples, the safety processor 302 and/or the redundant processing cores 304a, 304b may include one or more specialized processing units, such as RISC processors with an ARM core, graphic processing units, digital signal processors, and/or system-on-chips (SoC). The safety processor 302 and/or the redundant processing cores 304a, 304b execute machine readable instructions, such as the redundant instructions 306a, 306b that may be stored locally at the processor (e.g., in an included cache or SoC), in a storage device such as a random access memory, a read only memory, and/or a mass storage device.

The redundant processing cores 304a, 304b and the redundant instructions 306a, 306b allow redundant and/or diverse inputs and outputs to be processed by the safety system 240, which provides a highly reliable and predictable system. Thus, while representative inputs and outputs are illustrated in FIG. 3, these inputs and/or outputs may be duplicated to support the redundant processing cores 304a, 304b and the redundant instructions 306a, 306b. The redundant instructions 306a, 306b (e.g., embedded software, operating system, and generated code) execute by the safety processor 302 is compliant with the processes outlined in international standards, including but not limited to ISO 13849-1, which pertains to "Safety Related Parts of Control Systems." While the example safety processor 302 includes multiple, redundant processing cores, in other examples the safety processor 302 may include a single processing core, or multiple, non-redundant processing cores.

The safety system 240 of FIG. 3 further includes an actuator disabling circuit 308 that selectively disables a power amplifier 310 from providing energy to the motor 242 of the crosshead 244. Additionally or alternatively, the actuator disabling circuit 308 (or another actuator disabling circuit) may disable the grip actuator(s) 246 from providing energy to the pneumatic grip(s) 248. The power amplifier 310 receives input power and outputs power to the motor 242 to control movement of the crosshead 244. The example actuator disabling circuit 308 and the power amplifier 310 may be implemented using a safety rated Safe Torque Off (STO) high-reliability servo power amplifier. The control processor 238 may control the motor 242 and movement of the crosshead 244 via a motor control signal 312 to the power amplifier 310.

In response to an STO signal 314 from the safety processor 302, the actuator disabling circuit 308 disables the connected actuator (e.g., the motor 242). For example, the actuator disabling circuit 308 may disconnect all energy to the motor 242 (and/or other moving parts in the material testing system 100), in less than a certain defined period of time. The example actuator disabling circuit 308 may provide an STO feedback signal 315 to the safety processor 302, which indicates whether the actuator disabling circuit 308 is currently disabling the actuator. The safety processor 302 may compare the STO signal 314 to the STO feedback signal 315 to detect faults.

In the example material testing system 100, the travel of the moving crosshead 244 and any internal components is stopped after activation of the STO signal 314 as specified by international standards. Most of the subsystems of the safety system 240 disclosed herein activate the actuator disabling circuit 308 to safely stop the machine. Additionally, the power amplifier 310 may include a motor braking circuit 316 to decelerate the motor 242 before applying the STO signal 314. The motor braking circuit 316 allows the motor 242 to stop in a more controlled manner by eliminating continued movement by mechanical inertia after shutting down drive power. Using pre-disabling braking reduces or minimizes the motion of the crosshead 244 after the motor 242 is de-energized. Thus, the example actuator disabling circuit 308 and the motor braking circuit 316 provide a Category 1 stop as defined in the IEC 60204-1 standard, which is the "Electrical Safety Standard for Machinery."

The example safety processor 302 monitors the motor 242 and/or the motor braking circuit 316 while pre-disabling braking is occurring to confirm that the motor 242 is braking. If the safety processor 302 determines that the motor 242 is not slowing down during the braking, then the safety processor 302 performs a braking failure mitigation to cease the braking and immediately de-energize the motor 242. By implementing braking failure mitigation to the two-stage disabling sequence, the safety processor 302 may shorten stopping distance in situations in which the braking is ineffective. While the shortest stopping distance occurs when the pre-disabling braking is operative, when the pre-disabling braking is not completely operative, then a two-stage sequence involving an inoperative pre-disabling braking can have a longer stopping distance than a single-stage sequence (e.g., only disconnection). A secondary advantage of braking failure mitigation is that the mitigation enables more flexibility in implementing the two-stage disabling sequence, in that a wider range of components and systems can be used for high-performance braking with a braking failure mitigation process that can catch failures with the braking system.

The example safety system 240 further includes an emergency stop 318 (e.g., a button, a switch, etc.) that provides an emergency stop input signal 320 to the safety processor 302. The emergency stop 318 may be a manually operated emergency stop button, which is a complementary-type safety function. The emergency stop 318 includes two channel redundancy for signaling. The emergency stop 318 may include an emergency stop switch 322, emergency stop detection circuits 324, and an actuator disabling circuit 326. The emergency stop 318 is independently controllable using the hardware and embedded software of the safety processor 302. For example, in response to detecting the emergency stop input signal 320 from the emergency stop detector 324, the safety processor 302 sets the state of the material testing system 100 to the disable state and provides an emergency stop output signal 321 to the emergency stop 318 (e.g., to the emergency stop switch 322).

The emergency stop switch 322, in response to the emergency stop output signal 321, controls the actuator disabling circuit 326 to control the actuator disabling circuit 314 and/or the motor braking circuit 314 to stop the motor 242. The example actuator disabling circuit 326 may have a first connection to the motor braking circuit 314, and second redundant connections to the actuator disabling circuit 308. When the actuator disabling circuit 326 is triggered, the actuator disabling circuit 326 activates the motor braking circuit 314, delays for a time to permit the braking to occur, and then activates the actuator disabling circuit 308 to de-energize the applicable actuator.

In addition or as an alternative to control via the safety processor 302, the emergency stop switch 322 may directly actuate the actuator disabling circuit 308 within the power amplifier 310, such as by physical interruption of the STO signal 314 between the safety processor 302 and the actuator disabling circuit 308. The safety processor 302 monitors the emergency stop detection circuits 324 and acts as a redundant monitor to the hardware. The safety processor 302 outputs the STO signal 314 to control the actuator disabling circuit 308 to continue to disable the motor 242 so that, when the emergency stop switch 322 is released, the material testing system 100 will remain disabled (e.g., in a restricted state) and require user interaction to re-enable operation of the motor 242.

The example material testing system 100 (e.g., the test fixture 102) is compatible with interlock guarding systems with redundant or diverse contacts. The example safety system 240 may include one or more guards 328 and guard interlocks 330 configured to provide physical and/or virtual barriers to operator access to the material testing system 100 while operating in an unrestricted state. For example, the guards 328 may include physical barriers that are opened and closed to control access to the volume around the pneumatic grips 248 and/or the crosshead 244 (and/or other moving components). Example physical barriers include guard doors, which may use redundant safety switches to monitor whether the doors guarding the protected volume are open or closed. Each door switch has mechanically linked normally open and normally closed contacts, which may be dynamically pulsed (e.g., by the guard interlocks 330) and/or otherwise received as inputs. Pulsing permits plausibility diagnostic checking of the guard door switches in real time.

Additionally or alternatively, the guards 328 may include virtual guards that monitor the volume around the pneumatic grips 248 and/or the crosshead 244 for intrusion into the volume. Example virtual guards may include light curtains, proximity sensors, and/or pressure pads. While virtual guarding does not physically prevent access, the virtual guarding outputs guarding signals to the guard interlocks 330, which output interlock signals 332 to the safety processor 302 and/or actuator disabling circuit 308 (e.g., similar to the emergency stop switch 322 discussed above).

The interlocks 330 may trigger the actuator disabling circuit 308 to de-energize the motor 242. In some examples, the safety processor 302 controls re-enabling of the power amplifier 310 when the guard interlocks 330 are no longer triggered, in a similar manner as the emergency stop switch 322 discussed above.

Additionally or alternatively, the example safety system 240 may default to a restricted "setup" state when an operator enters the protected volume of the material testing system 100. Instead of disabling or de-energizing actuators of the system 100, the setup state enforces restrictions on speed, pressure, or other activities.

The example safety system 240 includes multiple state indicators 252 and mode switches 254. The example safety processor 302 monitors the mode switches 254 by, for example, dynamically pulsing the mode switches 254 to generate or obtain mode switch input signals 338 (e.g., one or more mode switch inputs for each of the mode switches 254). In some examples, the mode switches 254 are high-reliability switches. The safety processor 302 may test the mode switches 254 for short circuits or other faulty conditions periodically, aperiodically, in response to events (e.g., at startup of the material testing machine), on a predetermined schedule, and/or at any other times.

The example safety processor 302 controls the state indicators 252 to indicate the state of the material testing system 100 to the operator. For example, the safety processor 302 may output indicator signals 342 to the state indicators 252. If the state indicators 252 are lights, the output indicator signals 342 may, for example, control each of the lights to be on, off, flashing, and/or any other output for the lights. In some examples, the safety processor 302 determines the conditions of the indicators via indicator feedback signals 340. Example indicator feedback signals 340 may indicate to the safety processor 302 whether each of the state indicators 252 is on, off, short-circuited, open-circuited, and/or any other status or condition of the state indicators 252. If the processor determines that one or more of the state indicators 252 are not in the commanded proper state, the safety processor 302 controls the material testing system to be in a restricted state provides a notification to the operator (e.g., via the control panel 250 or other notification).

The safety system 240 includes a power supply monitor 344 to monitor the power supplies (e.g., DC and AC power supplies) that provide power to components of the material testing system 100. The power supply monitor 344 provides one or more power supply status signals 346 to the safety processor 302 and/or to the watchdog circuit 362 (described below) to indicate whether the monitored power supplies are within respective voltage and/or current ranges. If the power supply monitor 344 determines that one or more of the power supplies are out of tolerance, the safety processor 302 and/or to the watchdog circuit 362 may disable the material testing system 100 and alert the operator.

The example safety system 240 further includes one or more speed sensor(s) 348. The example speed sensor(s) 348 may be integrated, redundant, and/or diverse speed monitoring sensors. The speed sensor(s) 348 provide speed signal(s) 350, which are representative of the crosshead speed, to the safety processor 302. The safety processor 302 monitors the speed signal(s) 350 to ensure the crosshead 244 does not exceed an upper speed limit (e.g., crosshead travel limit(s) 352) as determined by the current operating mode of the machine. For example, the value of the upper speed limit may depend on whether the material testing system 100 is in a restricted state or an unrestricted state. In some examples, two speed sensors that operate on different principles may be used in the material testing system 100 to prevent the sensors 348 from sustaining common cause failures. The speed signal 350 of each speed sensor 348 is read and compared by the safety processor 302 to verify that the speed signals 350 are in agreement. If one speed sensor 348 indicates a different speed than another speed sensor 350, the safety processor 302 disables the material testing system 100 (e.g., via the actuator disabling circuit 308).

The example crosshead travel limit(s) 352 may include a travel limit that specifies a limit on the position of the crosshead 244. When the crosshead travel limit(s) 352 is reached, the safety processor 302 stops the motion of the crosshead 244. In some examples, the crosshead travel limit(s) 352 are multi-level limits, where the number of limits that are triggered indicate how far the crosshead travel limit(s) 352 have been exceeded. In some examples, a first level limit is handled by the safety processor 302 to stop operation of the applicable actuator (or all actuators), such as the motor 242. As the crosshead 244 continues to move beyond the first level limit and hits a second level limit (e.g., farther outside of the acceptable range than the first level limit), the crosshead travel limit 352 may trigger a direct connection (e.g., a hardware connection) to the actuator disabling circuit 308 and/or the motor braking circuitry 316, and/or to the actuator disabling circuit 326, to trigger the two phase disabling of the motor 242.

In some examples in which the material testing system 100 includes automatic gripping (e.g., pneumatically powered grips, hydraulically powered grips, electrically powered grips, electromechanically powered grips, electromagnetically powered grips, etc.), the safety system 240 includes a grip controller 354 that controls the grip actuators according to a multi-pressure gripping scheme. The multi-pressure gripping scheme reduces (e.g., minimizes, eliminates) the risk of injury to an operator when installing material test specimens in the material testing system 100 the pneumatic grips 248.

When the safety processor 302 is controlling the material testing system 100 in the setup state, the safety processor 302 provides a pressure signal 356 to the grip controller 354. The grip controller 354 controls the upper limit on the pressure that may be applied via the grips 248 by controlling the grip actuator(s) 246. The pressure signal 356 (which may be directly proportional to specimen gripping force) is limited to allow enough pressure to grip the specimen via the grips 248, but not enough pressure to cause severe injury to the operator. Conversely, when the safety processor 302 is controlling the material testing system 100 in the caution or testing states, the safety processor 202 provides the pressure signal 356 to cause the grip controller 354 to enable the higher pressure used to grip test specimens during testing. The example grip controller 354 may monitor the main system pressure (e.g., via pressure sensor(s) 358) and/or the pressure(s) in the pneumatic grip(s) 248 (e.g., upper and lower grips). The grip controller 354 feeds the pressure signals 360 to the safety processor 302 to verify that the commanded pressures are being enforced.

In some examples, the grip controller 354 is controlled via an operator input using a foot pedal switch. For example, the foot pedal switch may include separate switches to apply pressure and to release pressure via the pneumatic grip(s) 248. The switches may be mechanically linked switches, which may be dynamically pulsed to check for plausibility between the switches and/or to monitor for potential faults in the switches (e.g., electrical faults).

The safety processor 302 further controls the grip controller 354 to de-energize the grip actuator(s) 246 when power is disabled to the material testing system 100. For example, the safety processor 302 may control the grip actuator(s) 246 (e.g., via one or more valves, relays, etc.) to enable pressurization when powered, but to be normally depressurized for pneumatic actuators such that the pneumatic grip(s) 248 are prevented from applying grip force when the material testing system 100 is unpowered.

The example safety system 240 further includes a watchdog circuit 362. The watchdog circuit 362 communicates with the safety processor 302 periodically, aperiodically, in response to one or more events or triggers, and/or at any other time to verify the operation of the safety processor 302. For example, the safety processor 302 may communicate a heartbeat signal, or a response to a challenge from the watchdog circuit 362, to indicate to the watchdog circuit 362 that the safety system 240 is operating properly. If the watchdog circuit 362 does not receive an expected signal from the safety processor 302, the watchdog circuit 362 disables the material testing system 100 and notifies the operator.

The example safety processor 302, the example emergency stop 322, the example guard interlock 330, the example crosshead travel limit(s) 352, and/or the example watchdog circuit 362 are coupled (e.g., connected via hardware) to the actuator disabling circuit 326. When any of the safety processor 302, the emergency stop 322, the guard interlock 330, the crosshead travel limit(s) 352, and/or the watchdog circuit 362 determine that a respective condition is satisfied so as to disable the material testing system 100 (e.g., activation of the emergency stop switch 322, tripping of the guard 328, exceeding a crosshead travel limit 352, and/or triggering of the watchdog circuit 362), the actuator disabling circuit 326 is used to activate the motor braking circuit 316 and the actuator disabling circuit 308. The safety processor 302 may determine that the state of the material testing system 100 is the disabled state.

While the example control processor 238 and the safety processor 302 are illustrated as separate processors, in other examples the control processor 238 and the safety processor 302 may be combined into a single processor or set of processors that are not divided into control and safety functions. Furthermore, the control processor 238, the safety processor 302, and/or combined processors may include non-processing circuitry, such as analog and/or digital circuitry to perform one or more specialized functions.

Figure 4:
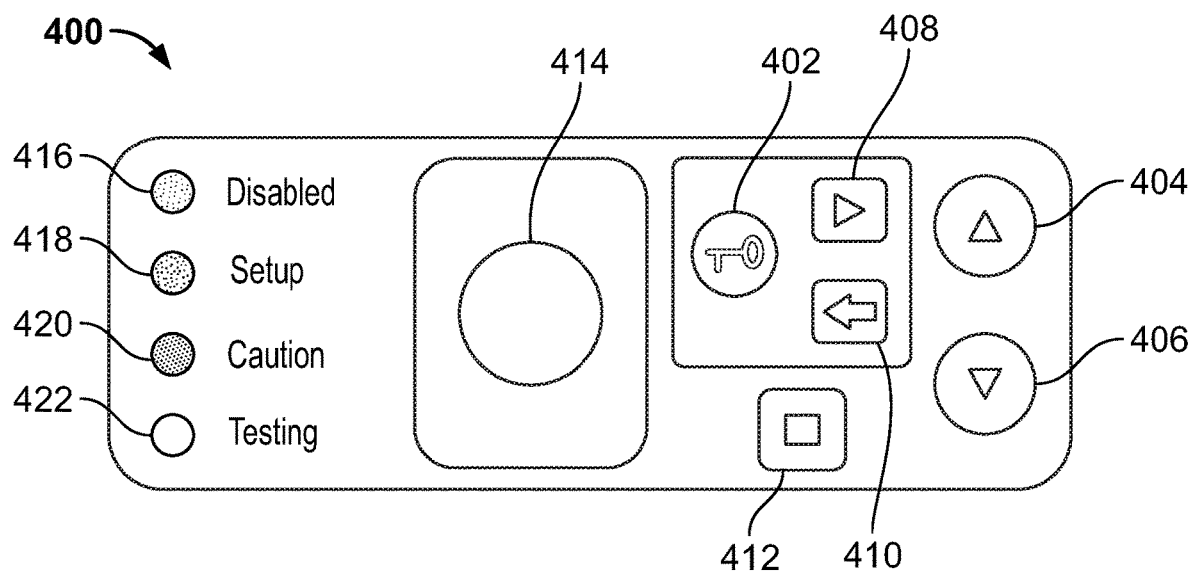
FIG. 4 illustrates an example operator interface that may be used to implement the operator interface of FIGS. 1-3.

FIG. 4 illustrates an example operator interface 400 that may be used to implement the control panel 250 of FIGS. 2 and 3. The operator interface 400 may be attached to the example test fixture 102, located proximate to the text fixture, and/or located remotely from the test fixture 102. For example, the operator interface 400 may be implemented as a built-in operator panel or switch on a base tray of the test fixture 102.

The example operator interface 400 includes multiple input devices (e.g., buttons, switches, etc.) which provide inputs to the control processor 238 and/or to the safety system 240 of FIGS. 2 and/or 3. The example input devices include a state control button 402, which controls the transition from a restricted state (e.g., the setup state) to an unrestricted state (e.g., the caution state, the testing state), and may be required to be used to perform actions involving the unrestricted states. The state control button 402 may be considered as an "unlock" button or safety input that enables use of the material testing system in unrestricted states.

Jog buttons 404, 406 control the motor 242 to jog the crosshead 244 in an up or down (or left and right, or directions based on any other orientation) direction (for directional crosshead movement) and/or in a right-hand or left-hand rotational direction (for rotational crosshead movement). When depressed individually, the jog buttons 404, 406 control the crosshead 244 to move up or down at a low speed (e.g., determined by the safety processor 302). When a jog button 404, 406 is depressed simultaneously with the state control button 402, the safety processor 302 may reduce the speed restriction on the motor 242 and allow jogging of the crosshead 244 at higher speeds. The example jog buttons 404, 406 may serve as directional inputs. In examples in which the crosshead 244 provides rotational force or motion, directional inputs may include rotational inputs such as right hand rotation and left hand rotation.

As used herein, received "simultaneously" refers to both inputs being activated or depressed at any given time, not necessarily that both buttons have to be initially depressed at exactly the same moment.

A start button 408 controls the control processor 238 to initiate a material test. A return button 410 controls the control processor 238 to return the crosshead 244 to a predetermined position, which may be accomplished at low speed or high speed. In some examples, the safety processor 302 requires that the start button 408 and/or the return button 410 be depressed in conjunction with the state control button 402. A stop button 412 controls the control processor 238 to stop or pause a running test. An emergency stop switch 414 may be included to implement the emergency stop switch 322 of FIG. 3.

The operator interface 400 further includes state indicators 416-422 to output an indication of a present state of the material testing system 100. The example state indicators 416-422 are lights representative of each of the states of the material testing system 100 that may be determined by the safety processor 302. In the example of FIG. 4, the operator interface 400 includes a disabled state indicator 416, a setup state indicator 418, a caution state indicator 420, and a testing state indicator 422. Each of the state indicators 416-422 is lit when the safety processor 302 determines that the material testing system 100 is in the corresponding state, while the state indicators 416-422 not corresponding to the present state are unlit.

Figure 5:
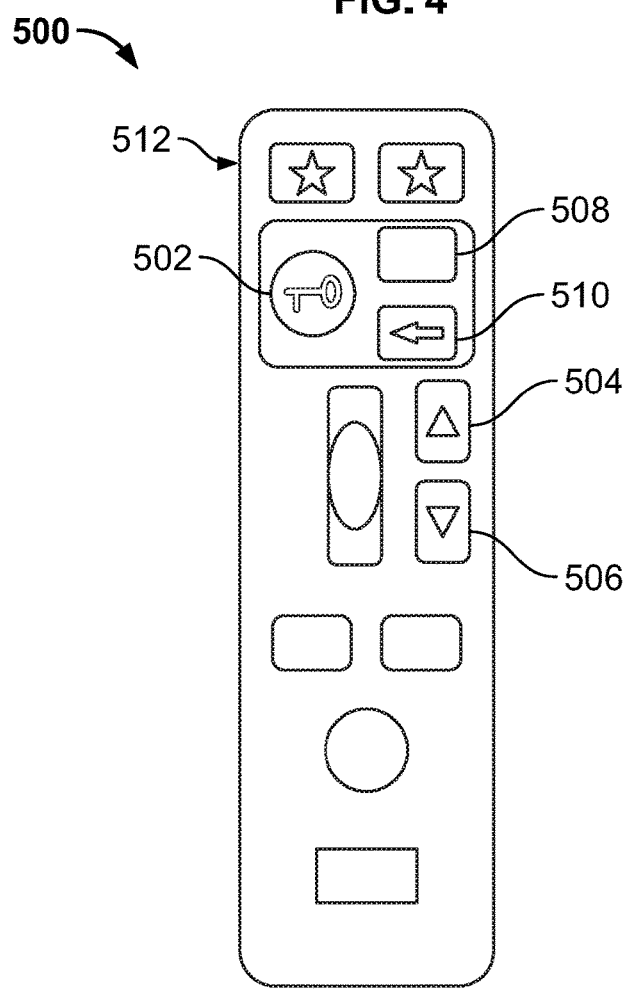
FIG. 5 illustrates another example operator interface that may be used to implement that operator interface of FIGS. 1-3.

FIG. 5 illustrates another example operator interface 500 that may be used to implement that control panel 250 of FIGS. 2 and 3. The example operator interface 500 may be a handset having a limited set of input devices (e.g., buttons, switches, etc.). The operator interface 500 may be attached to the example test fixture 102, located proximate to the text fixture, and/or located remotely from the test fixture 102. The operator interface 500 includes a state control button 502 (e.g., similar or identical to the state control button 402 of FIG. 4), jog buttons 504, 506 (e.g., similar or identical to the jog buttons 404, 406), a start button 508 (e.g., similar or identical to the start button 408), and a return button 510 (e.g., similar or identical to the return button 410).

The operator interfaces 400, 500 may include custom buttons 512, or soft keys, which provide programmable functions to the operator. In some examples, the programmable functions are subject to the restrictions of one or more of the restricted states.

Figure 6:
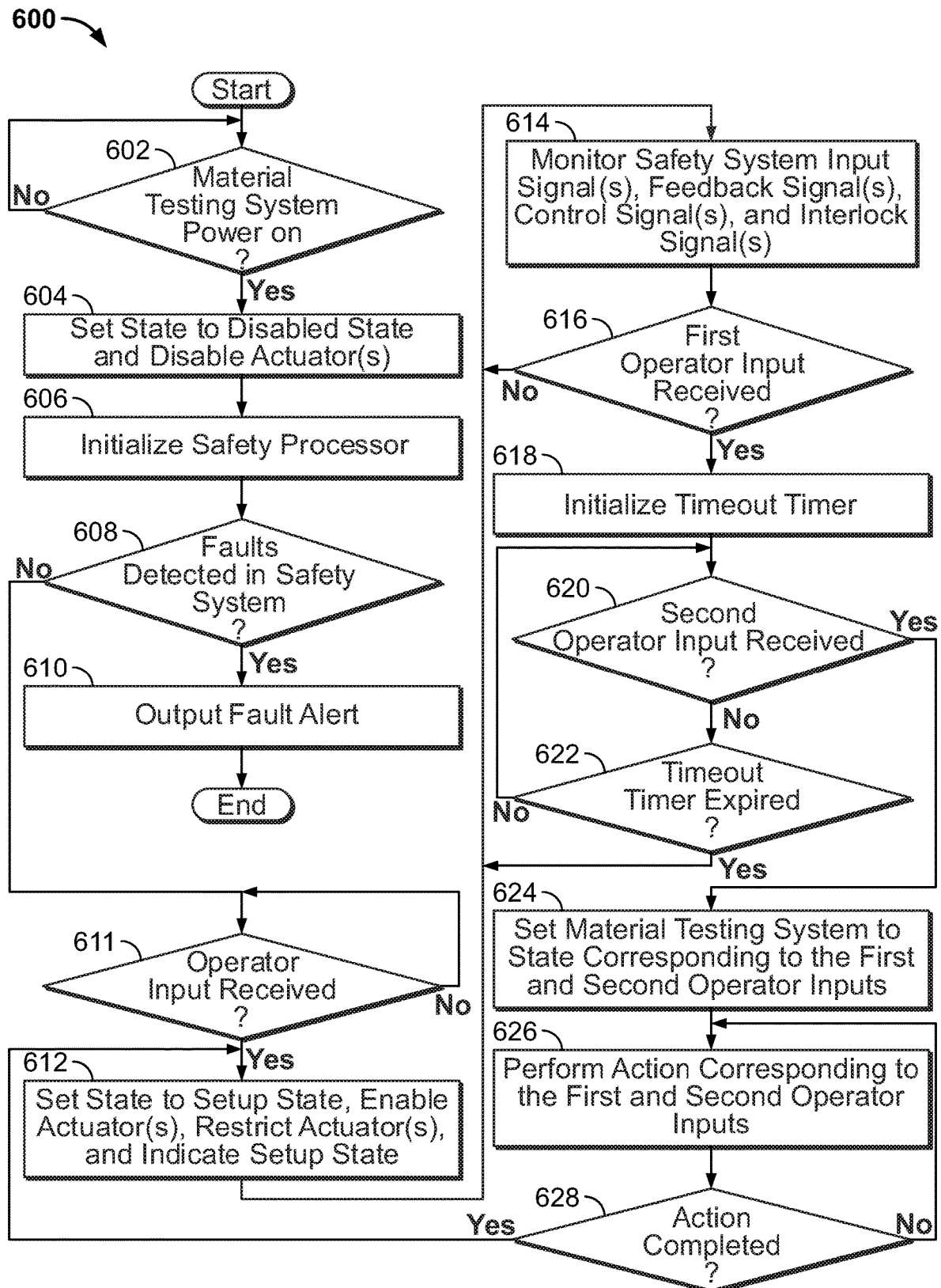
FIG. 6 is a flowchart representative of example machine readable instructions which may be executed by the safety system of FIGS. 2 and 3 to control actuation of the material testing system of FIGS. 1-3 in an unrestricted mode.

FIG. 6 is a flowchart representative of example machine readable instructions 600 which may be executed by the safety system 240 of FIGS. 2 and 3 to control actuation of the material testing system 100 of FIGS. 1-3 in an unrestricted mode. The example instructions 600 enforce a dual activation requirement in which multiple inputs are required within a timeout period to enable transitions from restricted states to unrestricted states.

The example instructions 600 may be executed to determine a state of the material testing system from a plurality of predetermined states, enforce restrictions on the actuator, and automatically set the state of the material testing system to one of the restricted states in response to completion of an action involving controlling the actuator.

At block 602, the material testing system 100 and/or one or more subsystems may be powered on. If the material testing system 100 is not powered on, block 602 iterates until the material testing system 100 is turned on. When the material testing system 100 is powered on (block 602), at block 604 the safety system 240 sets the state of the material testing system 100 to a disabled state and disables one or more actuator(s) (e.g., the motor 242, the grip actuator(s) 246). For example, the safety system 240 may default the actuator disabling circuit 308 to de-energizing the motor 242.

At block 606, the safety processor 302 is initialized. For example, the safety processor 302 may perform fault checks (e.g., checking inputs, outputs, and/or attached devices for open circuits and/or closed circuits), redundancy checks (e.g., determining that redundant inputs and/or redundant outputs are in agreement), and/or other initialization processes.

At block 608, the safety processor 302 determines whether any faults are detected in the safety system 240 (e.g., detected during the initialization process). If faults are detected (block 608), at block 610 the safety processor 302 outputs a fault alert (e.g., via the control panel 250, via the computing device 104, etc.). The example instructions 600 may then end.

When faults are not detected (block 608), at block 611 the safety processor 302 determines whether an operator input has been received to transition the material testing system 100 from the disabled state to a setup state. For example, the safety processor 302 may require one or more specified inputs (e.g., pressing an unlock button) to transition from the disabled state. If the operator input has not been received (block 611), block 611 iterates while the material testing system 100 remains in the disabled mode to await the operator input.

When the operator input is received (block 611), at block 612 the safety processor 302 sets the state of the material testing system 100 to a setup state. In accordance with setting the setup state, the safety processor 302 enables the actuator(s) (e.g., the motor 242), restricts the actuator(s), and indicates the state as the setup state (e.g., via the state indicators 252). In some examples, the safety processor 302 controls one or more visual indicators on the control panel 250 to selectively emphasize corresponding ones of the operator selectable inputs (e.g., mode switches 254) based on the state of the material testing system 100 being the setup state. For example, the safety processor 302 may control the visual indicators to emphasize the inputs that may be used by the operator in the setup mode and deemphasize the inputs that may not be used in the setup mode.

At block 614, the safety processor 302 monitors input signals of the safety system 240 (e.g., sensor signals 320, 332, 338, 346, 350), feedback signals (e.g., feedback signals 315, 340, 360), control signals (e.g., signals from the control processor 238), and/or interlock signals (e.g., the guard signal 332 from the guard interlock 330). The safety processor 302 may monitor the signals to, for example, identify operator commands and/or conditions that would cause the safety processor 302 to recognize a change in the state of the material testing system 100.

At block 616, the safety processor 302 determines whether a first operator input is received. An example first operator input may include a mode switch 254 (e.g., an Unlock key, button, or switch), a presence sensor (e.g., a proximity sensor, a pressure sensitive surface, a motion sensor, a light curtain, a mechanical guard door, a camera and processing circuitry, etc.), or any other source of operator input. The first operator input may include determining a presence in a first location in which the operator is incapable of accessing a protected volume and can access a second operator input. Additionally or alternatively, the first operator input may include the lack of presence within the protected volume itself. If the first operator input has not been received (block 616), control returns to block 614 to continue monitoring.

When a first operator input is received (block 616), at block 618 the safety processor 302 initializes a timeout timer. The timeout timer may be a software timer, a dedicated hardware timer, or any combination of hardware and software. In some examples, the first operator input may cause the safety processor 302 to determine the state to be in a caution state, and indicate that the caution state is the current state (e.g., via the state indicators 252).

At block 620, the safety processor 302 determines whether a second operator input has been received. The example second operator input may include a mode switch 254 (e.g., an Unlock key, button, or switch), a presence sensor (e.g., a proximity sensor, a pressure sensitive surface, a motion sensor, a light curtain, a mechanical guard door, a camera and processing circuitry, a room entry detector, etc.), or any other source of operator input. The safety processor 302 may require that the combination of the first input and the second input include both of a desired operation (e.g., jog the crosshead 244 at a speed higher than a restricted setup speed, start a material test, return the crosshead 244 to a desired position, actuate the pneumatic grips 248 at a pressure higher than a threshold pressure) and an intention-indicating input (e.g., an unlock button, a lack of presence in the protected volume, a presence at a location away from the protected volume).

In some examples, the safety processor 302 may require that the desired operation input and the intention-indicating input be received in a required order (e.g., the desired operation input before the intention-indicating input or the intention-indicating input before the desired operation input).

If the second operator input has not been received (block 620), at block 622 the safety processor 302 determines whether the timeout timer has expired. For example, the timeout timer may be set to expire after running for a predetermined threshold time period, within which the two operator inputs must be received to indicate an operator intention to perform the action (e.g., to avoid unintentional actuation). If the timeout timer has not expired (block 622), control returns to block 620 to continue monitoring for a second operator input. If the timeout timer has expired (block 622), the first operator input times out and control returns to block 614 to continue monitoring.

When the second operator input is received prior to expiration of the timeout time (block 620), at block 624 the safety processor 302 sets the material testing system 100 to the state corresponding to the operator inputs (e.g., an unrestricted state, such as the caution state or the testing state). For example, the safety processor 302 may transition the material testing system 100 to the caution state and then the testing state when the first and second operator inputs correspond to a test start (e.g., the state switch button 502 and the start button 510). The safety processor 302 also reduces and/or removes restrictions associated with the set state to perform the action corresponding to the operator inputs.

At block 626, the control processor 238 performs the action corresponding to the first and second operator inputs. For example, the control processor 238 may perform a programmed material test, control the motor 242 to jog the crosshead and/or return the crosshead to a desired position, apply a high gripping or clamping pressure, and/or any other action corresponding to the operator inputs. At block 628, the safety processor 302 determines whether the action is completed. The action may be completed when, for example, either of the first or second inputs are no longer being received, if the control processor 238 has completed a programmed material test, if an interlock is triggered. In some examples, the safety processor 302 ceases operation of the actuator in response to determining that one of the two inputs is no longer being received. In some other examples, the safety processor 302 permits the operation of the actuator to continue while at least one of the inputs is received, and ceases operation of the actuator in response to determining that none of the two or more inputs are being received. In some examples, the safety processor 302 permits the operation of the actuator to continue even when the inputs are no longer received (e.g., for extended-duration testing), and ceases operation of the actuator in response to conclusion of the material testing process, a pause in the material testing process, or an input from the operator interface (e.g., pressing the stop button 412 of FIG. 4).

If the action is not completed (block 628), control returns to block 626 to continue performing the action. When the action has completed (block 628), control returns to block 612 to return to the setup state. The safety processor 302 may then reapply the corresponding restrictions.

Figure 7:
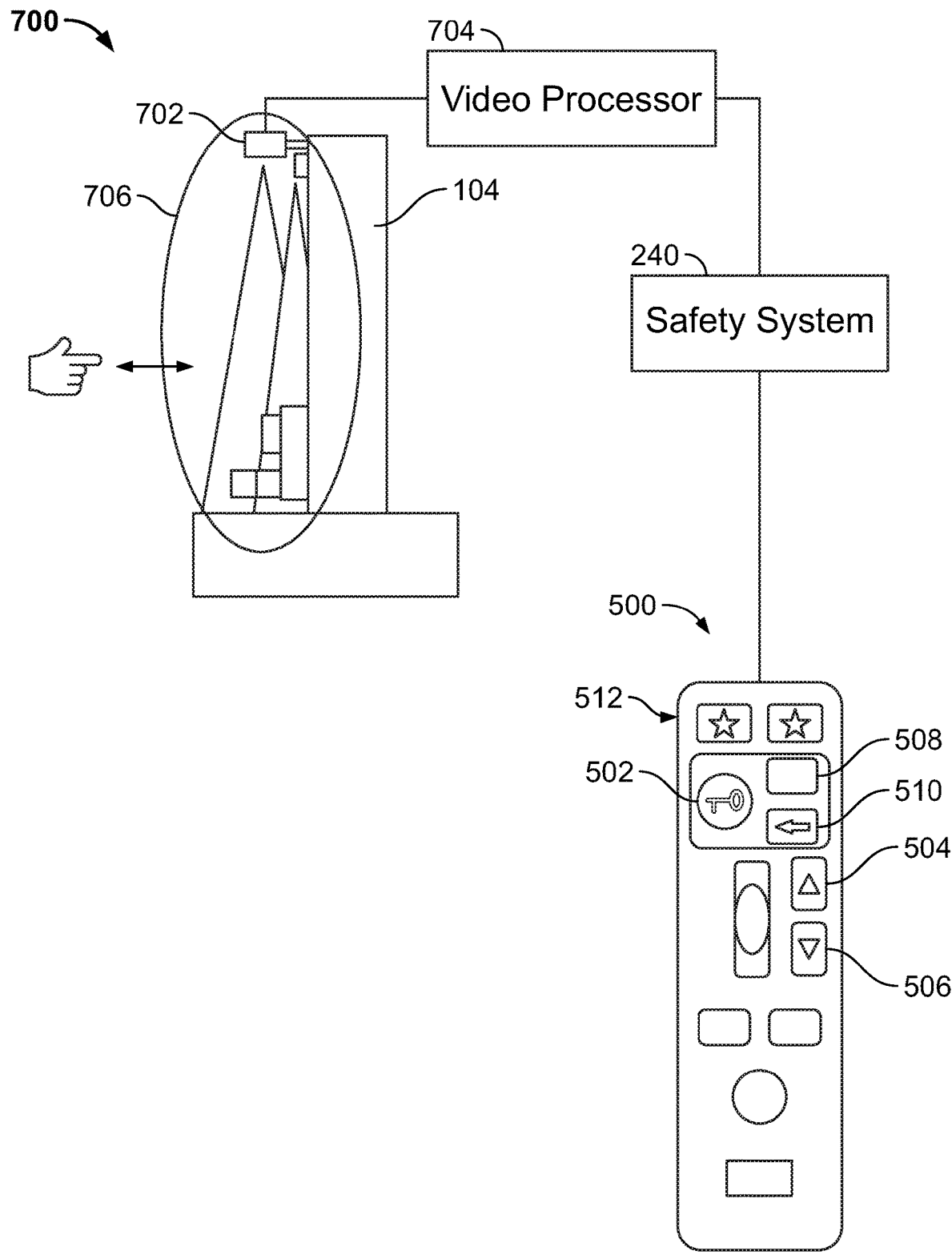
FIG. 7 illustrates an example material test system including a camera and a video processor configured to provide input signals to the safety system to operate the material test system.

FIG. 7 illustrates an example material test system 700 including a camera 702 and a video processor 704 configured to provide input signals to the safety system 240 to operate the material test system 700. The example material test system 700 includes the material testing system 100 of FIGS. 1-3, including the safety system 240, and the operator interface 500 of FIG. 5.

A camera 702 monitors a protected volume 706 (e.g., a volume adjacent the test fixture 102). The video processor 704 detects an intrusion by processing images output by the camera 702, and outputs a non-detection signal to the safety system 240 in response to determining that an intrusion is not detected. The safety system 240 may, for example, poll the input from the video processor 704 to determine a value representative of detection or non-detection. The example safety system 240 may then use the non-detection signal as the first input signal or the second input signal (e.g., in the instructions 600 of FIG. 6) to enable some operations of the material testing system 100. When an operator or object is detected by the camera 702 and the video processor 704 as within the volume 706, the video processor 704 stops providing the non-detection signal (or provides a detection signal) to the safety system 240, which then disables operation of the material test system 100. The operator interface 500 may provide the additional signal to indicate which operator is desired.

Figure 8:
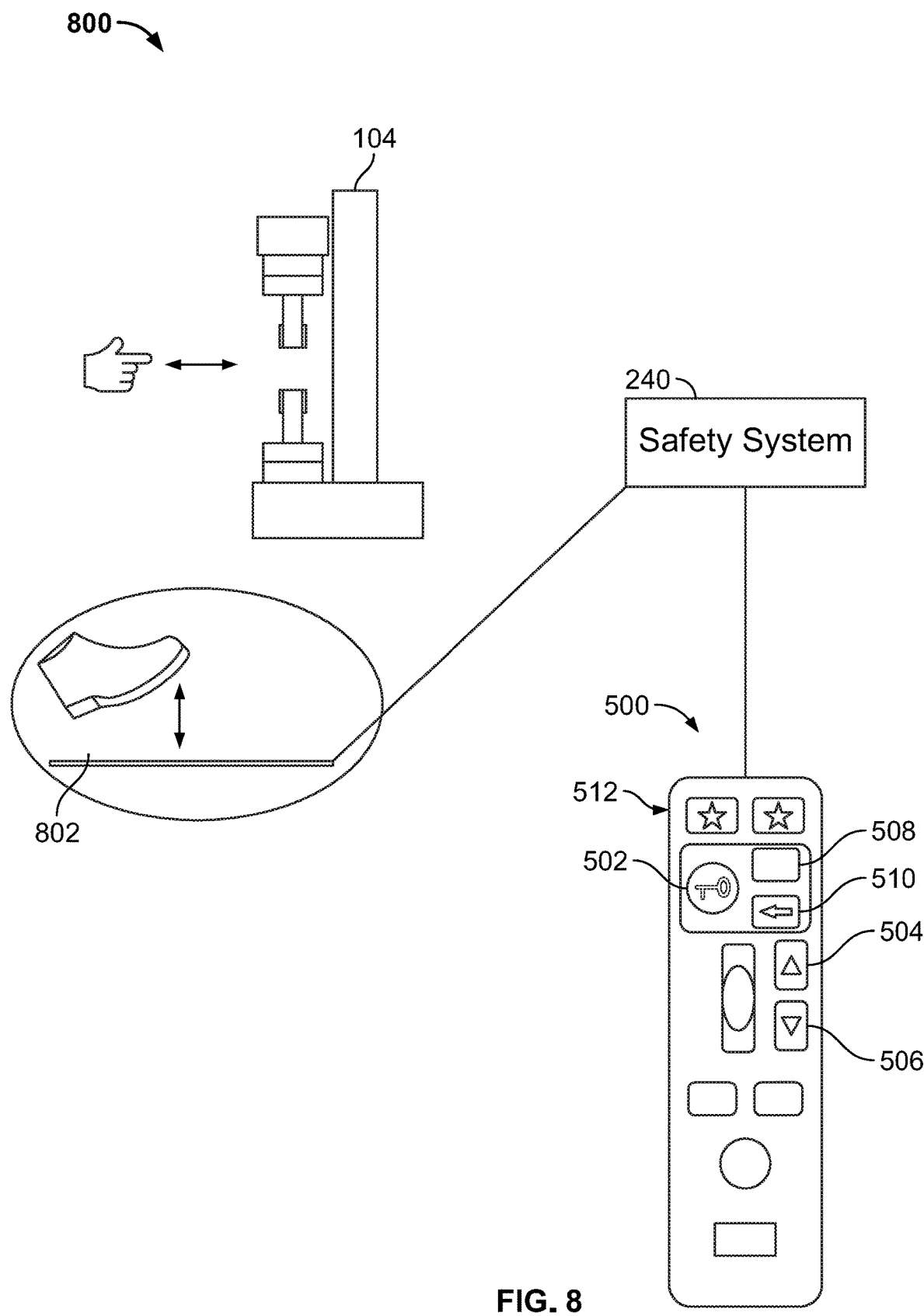
FIG. 8 illustrates an example material test system including a pressure sensitive surface configured to provide input signals to the safety system to operate the material test system.

FIG. 8 illustrates an example material test system 800 including a pressure sensitive surface 802 configured to provide input signals to the safety system 240 to operate the material test system 800. The example material test system 800 includes the material testing system 100 of FIGS. 1-3, including the safety system 240, and the operator interface 500 of FIG. 5.

The pressure sensitive surface 802, such as a pressure pad, detects the presence of a pressure (e.g., an operator) on the surface 802. When the presence of the pressure is detected, the pressure sensitive surface 802 outputs a pressure signal to the safety system 240. The pressure sensitive surface 802 may be located such that, when the presence is detected, the operator standing on the pressure sensitive surface 802 is out of reach or otherwise incapable of reaching the protected volume. The safety system 240 may, for example, poll the input from the pressure sensitive surface 802 to determine a value representative of detection or non-detection. The example safety system 240 may then use the pressure signal as the first input signal or the second input signal (e.g., in the instructions 600 of FIG. 6) to enable some operations of the material testing system 100. When an operator or object is no longer detected by pressure sensitive surface 802, the pressure sensitive surface 802 stops providing the detection signal (or provides a non-detection signal) to the safety system 240, which then disables operation of the material test system 100. The operator interface 500 may provide the additional signal to indicate which operator is desired.

Figure 9:
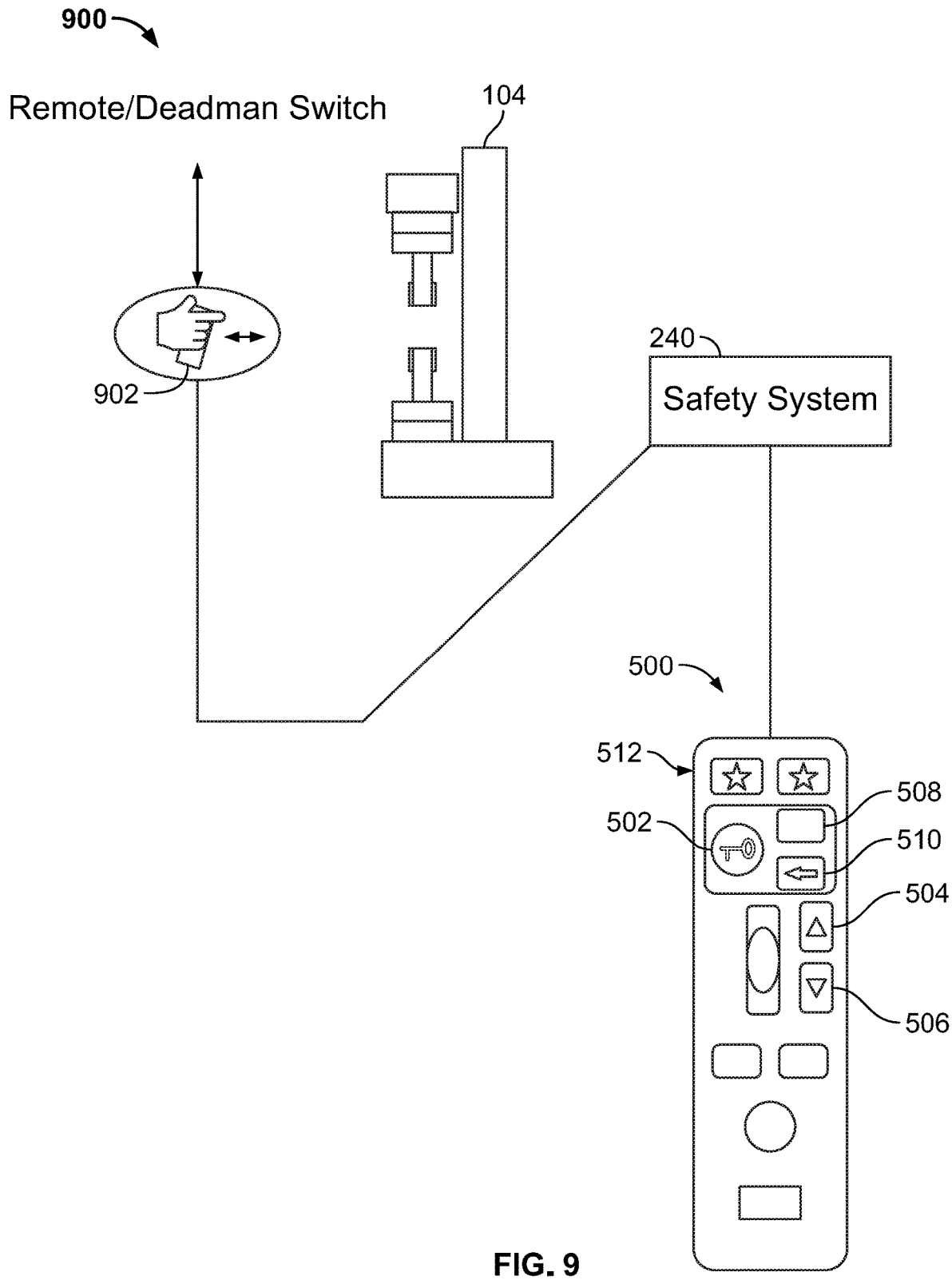
FIG. 9 illustrates an example material test system including an operator detection switch configured to provide input signals to the safety system to operate the material test system.

FIG. 9 illustrates an example material test system 900 including an operator detection switch 902 configured to provide input signals to the safety system 240 to operate the material test system 900. The example material test system 900 includes the material testing system 100 of FIGS. 1-3, including the safety system 240, and the operator interface 500 of FIG. 5.

The operator detection switch 902, such as a deadman switch, detects the presence of the operator by triggering of the switch, where failure to continuously depress the switch 902 automatically causes release of the switch 902. When the depression of the switch occurs, the operator detection switch 902 outputs a switch signal to the safety system 240. The operator detection switch 902 may be located such that, when the switch 902 is depressed, the operator depressing the switch 902 is out of reach or otherwise incapable of reaching the protected volume. The safety system 240 may, for example, poll the input from the operator detection switch 902 to determine a value representative of detection or non-detection. The example safety system 240 may then use the switch signal as the first input signal or the second input signal (e.g., in the instructions 600 of FIG. 6) to enable some operations of the material testing system 100. When the switch 902 is no longer depressed, the operator detection switch 902 stops providing the switch signal (or provides a signal indicative of non-activation of the switch 902) to the safety system 240, which then disables operation of the material test system 100. The operator interface 500 may provide the additional signal to indicate which operator is desired.

Figure 10:
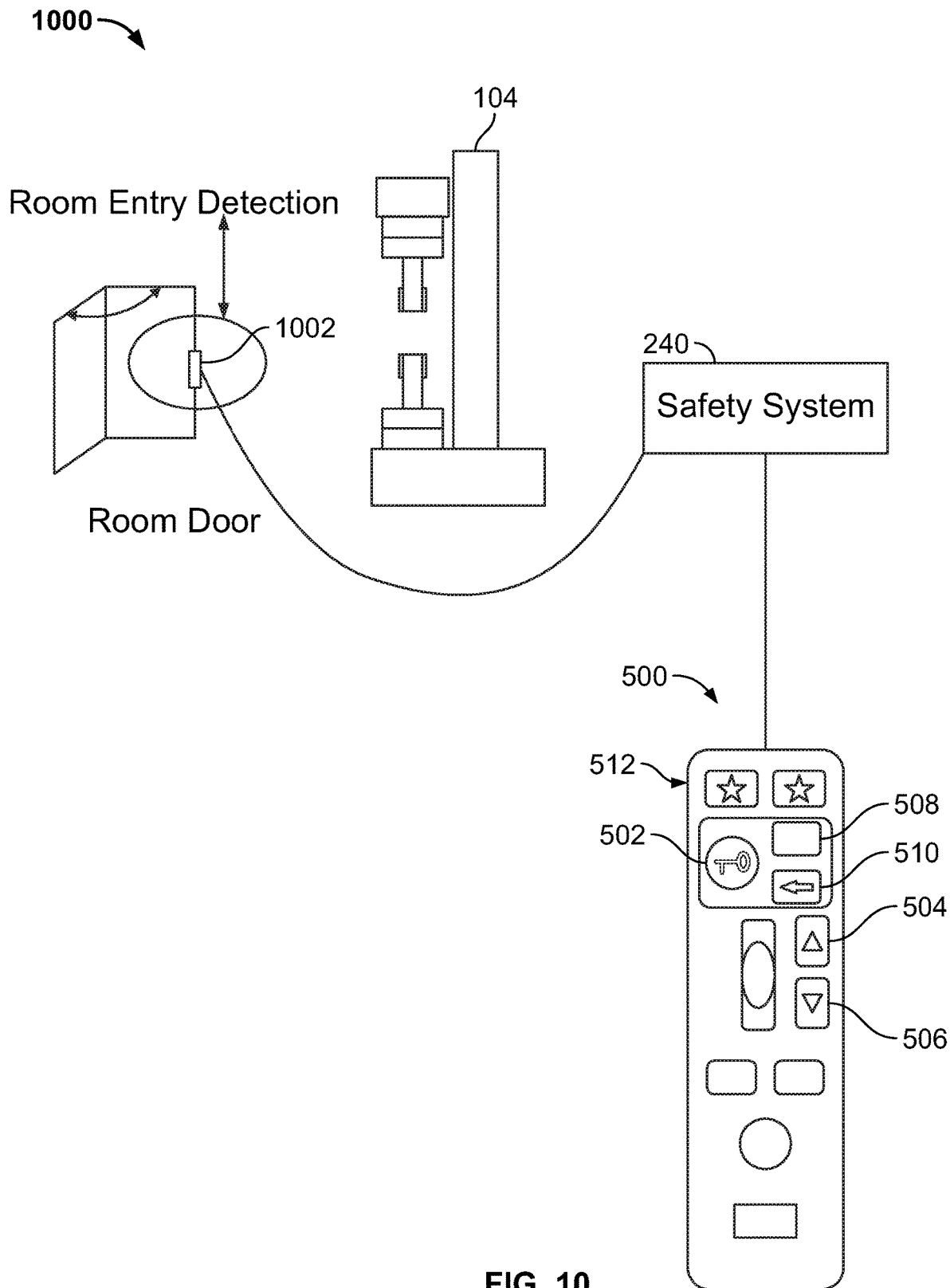
FIG. 10 illustrates an example material test system including a presence detector configured to provide input signals to the safety system to operate the material test system.

FIG. 10 illustrates an example material test system 1000 including a presence detector 1002 configured to provide input signals to the safety system 240 to operate the material test system 1000. The example material test system 1000 includes the material testing system 100 of FIGS. 1-3, including the safety system 240, and the operator interface 500 of FIG. 5.

The presence detector 1002, such as a room entry detector, a presence sensor or a motion sensor, detects the presence of the operator in a particular area. When detection occurs by the presence detector 1002, the presence detector 1002 outputs a presence signal to the safety system 240. The presence detector 1002 may be located such that, when the presence detector 1002 recognizes the presence of an operator, the operator is out of reach or otherwise incapable of reaching the protected volume. The safety system 240 may, for example, poll the input from the presence detector 1002 to determine a value representative of detection or non-detection. The example safety system 240 may then use the presence signal as the first input signal or the second input signal (e.g., in the instructions 600 of FIG. 6) to enable some operations of the material testing system 100. When the presence detector 1002 no longer detects a presence, the presence detector 1002 stops providing the presence signal (or provides a signal indicative of no presence) to the safety system 240, which then disables operation of the material test system 100. The operator interface 500 may provide the additional signal to indicate which operator is desired.

Figure 11:
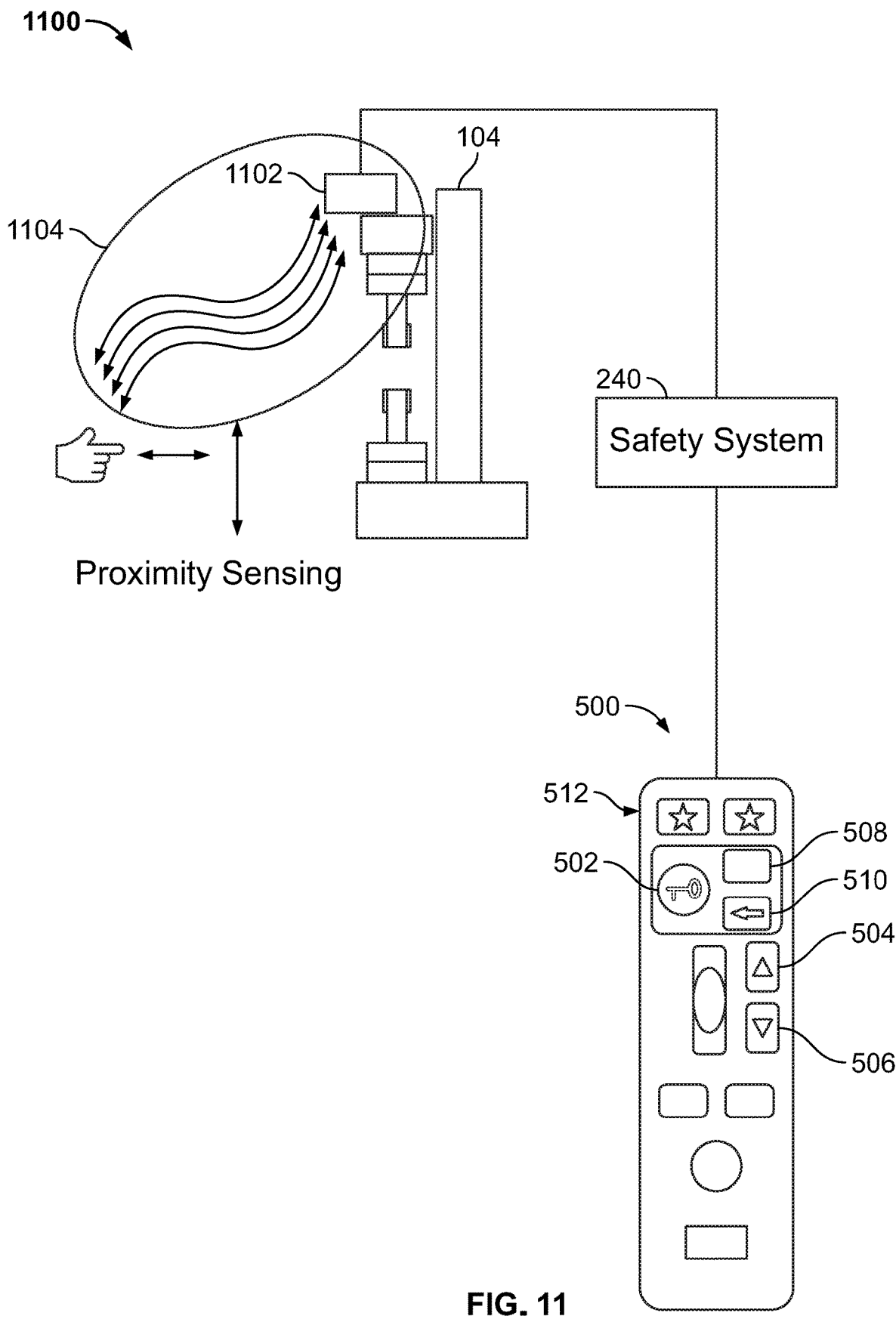
FIG. 11 illustrates an example material test system including a proximity sensor configured to provide input signals to the safety system to operate the material test system.

FIG. 11 illustrates an example material test system 1100 including a proximity sensor 1102 configured to provide input signals to the safety system 240 to operate the material test system 1100. The example material test system 1100 includes the material testing system 100 of FIGS. 1-3, including the safety system 240, and the operator interface 500 of FIG. 5.

The proximity sensor 1102 monitors a protected volume 1104 (e.g., a volume adjacent the test fixture 102) and outputs a non-proximity signal to the safety system 240 in response to determining that proximity of an operator is not detected. The safety system 240 may, for example, poll the input from the proximity sensor 1102 to determine a value representative of proximity or non-proximity. The example safety system 240 may then use the non-proximity signal as the first input signal or the second input signal (e.g., in the instructions 600 of FIG. 6) to enable some operations of the material testing system 100. When an operator or object is detected by proximity sensor 1102 as within the volume 1104, the proximity sensor 1102 stops providing the non-detection signal (or provides a detection signal) to the safety system 240, which then disables operation of the material test system 100. The operator interface 500 may provide the additional signal to indicate which operator is desired.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A material testing system, comprising:
an actuator configured to control an operator-accessible component of the material testing system;
an operator interface comprising:
a first input device configured to output an unlocking signal when a first input is received via the first input device;
a second input device configured to control the actuator to perform a first type of actuation when a second input is received via the second input device; and
a third input device configured to control the actuator to perform a second type of actuation when a third input is received via the third input device; and
one or more processors configured to:
control the actuator based on at least one of a material testing process, the second input device, or the third input device from the operator interface; and
require two or more inputs to be received within a predetermined threshold time to permit at least one operation of the actuator, the two or more inputs including the unlocking signal and one of the second input or the third input, wherein the one or more processors are configured to control a plurality of actuation types, a plurality of automatic material test operations, and a plurality of material test system states based on receiving the unlocking signal.

2. The material testing system as defined in claim 1, wherein the one or more processors are configured to require the two or more inputs to initiate each operation of the actuator by the processor.

3. The material testing system as defined in claim 1, wherein the one or more processors are configured to, in response to pausing or cessation of the operation of the actuator, require the two or more inputs to restart the operation or start a different operation.

4. The material testing system as defined in claim 1, wherein the operator-accessible component comprises an automatic grip configured to grip a material under test, wherein the actuator is configured to actuate the automatic grip, and the at least one operation comprises applying more than a threshold pressure via the automatic grip.

5. The material testing system as defined in claim 4, wherein the one or more processors are configured to permit control of the actuator to apply less than the threshold pressure via the automatic grip while fewer than the two or more inputs are received.

6. The material testing system as defined in claim 1, wherein the operator-accessible component comprises a crosshead configured to move to position a material under test or to apply force to the material under test, wherein the at least one operation comprises at least one of moving of the crosshead or applying the force to the material under test.

7. The material testing system as defined in claim 1, wherein the operator-accessible component comprises a crosshead configured to move to position a material under test or to apply force to the material under test, wherein the at least one operation comprises moving the crosshead at at least a threshold speed.

8. The material testing system as defined in claim 7, wherein the one or more processors are configured to permit control of the actuator to move the crosshead at less than the threshold speed while fewer than the two or more inputs are received.

9. The material testing system as defined in claim 1, wherein the one or more processors are configured to, during operation of the actuator, cease operation of the actuator in response to determining that at least one of the two or more inputs is no longer being received.

10. The material testing system as defined in claim 1, wherein the one or more processors are configured to, during operation of the actuator, cease operation of the actuator in response to determining that none of the two or more inputs are being received.

11. The material testing system as defined in claim 1, wherein the one or more processors are configured to, during operation of the actuator, continue operation of the actuator after the two or more inputs are no longer being received.

12. The material testing system as defined in claim 11, wherein the one or more processors are configured to cease operation of the actuator based on at least one of a conclusion of the material testing process, a pause in the material testing process, or an input from the operator interface.

13. The material testing system as defined in claim 1, wherein the one or more processors comprise:
- a control processor configured to perform the control of the actuator; and
- one or more safety processors configured to identify the two or more inputs and to permit at least one operation of the actuator.

* * * * *